No. 673,442.  
F. MOSSBERG.  
VEHICLE ALARM BELL.  
(Application filed Aug. 30, 1900.)

Patented May 7, 1901.

(No Model.)

Witnesses.  
Edgar S. Marsh.  
A. L. Makepeace.

Inventor.  
Frank Mossberg.  
By Arnold & Barlow  
Attorneys

UNITED STATES PATENT OFFICE.

FRANK MOSSBERG, OF ATTLEBORO, MASSACHUSETTS, ASSIGNOR TO THE FRANK MOSSBERG COMPANY, OF SAME PLACE.

VEHICLE ALARM-BELL.

SPECIFICATION forming part of Letters Patent No. 673,442, dated May 7, 1901.

Application filed August 30, 1900. Serial No. 28,615. (No model.)

*To all whom it may concern:*

Be it known that I, FRANK MOSSBERG, a resident of Attleboro, in the county of Bristol and State of Massachusetts, have invented certain new and useful Improvements in Vehicle Alarm-Bells; and I do hereby declare that the following is a full, clear, and exact description thereof, reference being had to the accompanying drawings, and to the letters of reference marked thereon, which form a part of this specification.

This invention relates to that class of alarm-bells used on vehicles for the purpose of giving notice of their approach and which are usually operated by the foot of the motorman. It is fully explained and illustrated in this specification and the annexed drawings.

Figure 1:
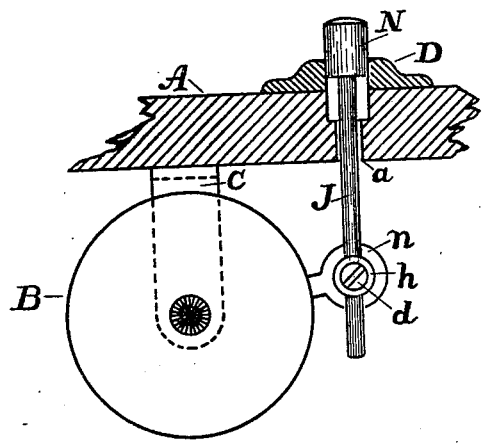
Figure 2:
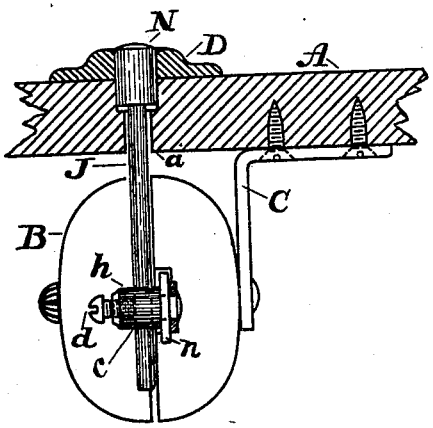

Figure 1 shows a side elevation of the bell attached to the under side of the floor of a car or automobile, the floor being shown in section. Fig. 2 shows in elevation an edge view of the bell and its operating mechanism attached to the floor of a vehicle, with the floor in section.

The object of this invention is to furnish an alarm-bell for vehicles—such as cars, automobiles, and the like—with the operating connections that with one pressure of the foot or hand will produce a multiplicity of strokes on the bell, thus obviating the necessity of repeating the pressure several times in order to give the desired alarm.

The construction and operation of the alarm are as follows:

In the drawings, A represents the floor of the vehicle in section, with the bell B attached to a knee-plate or bracket C, the upper part of which is securely fastened to the under side of the floor A. An aperture $a$ is made through the floor, and a collar D is preferably placed on the top of the floor A, with a hole in its center agreeing with the aperture $a$ in the floor. In this opening $a$ an upright rod J is fitted to slide freely, and a button or knob N is made fast on the upper end of the rod, and the hole in the collar and upper side of the floor A is chambered out enough to receive the button N when pressed down, so that it will be level with the top of the collar. The lower end of the rod J is attached to the outer end of the bell-lever $n$ by means of a stud $h$, that is pivoted to the lever so as to be free to turn, and a hole $c$ is made through the body of the stud $h$ to receive the rod J, and a set-screw $d$ is inserted in the outer end of the stud at any place desired, so that when the rod J is pressed down it will carry the lever $n$ with it and ring the bell. This makes a very effective construction and arrangement of an apparatus for the purpose. It is positive in its action, requires but little attention, and is not liable to get out of order.

Having thus described my improvements, I claim as my invention and desire to secure by Letters Patent—

In a vehicle-alarm the combination of a repeating bell attached to the floor of the vehicle by means of a knee-plate, one end of which is attached to the bell and the other end to the vehicle, an operating-rod having a button or knob on its upper end, a hole in the floor chambered out at its upper end to receive the button, a swivel-stud held in the outer end of the bell-lever and having a hole through it to receive said rod, and a set-screw in its outer end to press on the rod and hold it in place, substantially as described.

In testimony whereof I have hereunto set my hand this 23d day of August, A. D. 1900.

FRANK MOSSBERG.

Witnesses:
BENJ. ARNOLD,
EDGAR S. MARSH.